Oct. 27, 1936.                       C. O. BROWNE                       2,059,083
                       RECORDING OF SOUND WITH THE AID OF LIGHT
                                 Filed April 7, 1932
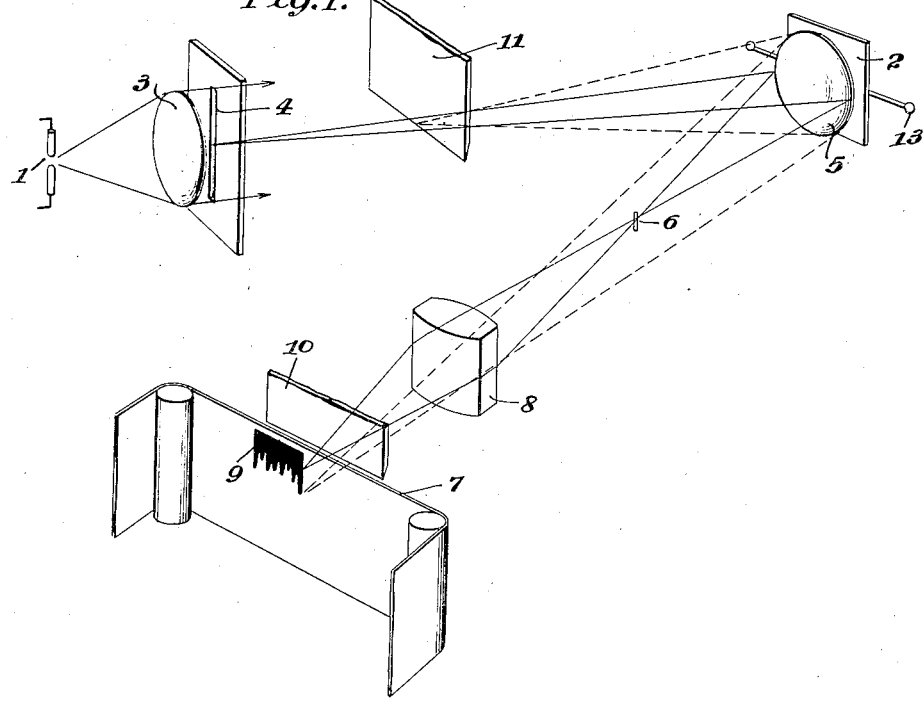
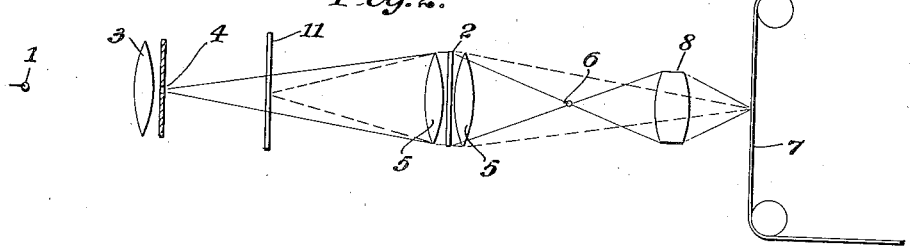
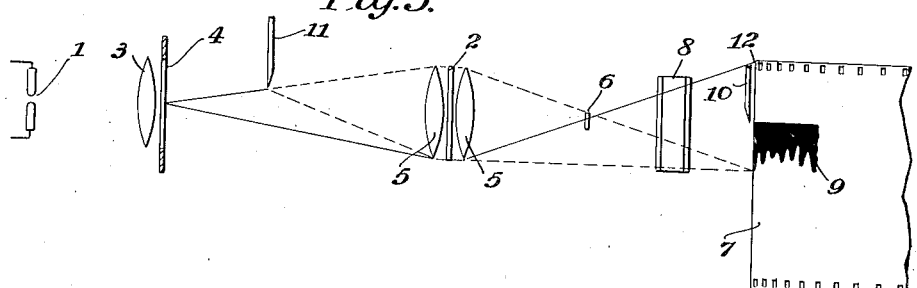
INVENTOR:
Cecil Oswald Browne
by
HIS ATTORNEY.

Patented Oct. 27, 1936

2,059,083

UNITED STATES PATENT OFFICE 2,059,083

RECORDING OF SOUND WITH THE AID OF LIGHT

Cecil Oswald Browne, West Acton, London, England, assignor to The Gramophone Limited, Hayes, England, a company of Great Britain Application April 7, 1932, Serial No. 603,776
In Great Britain April 10, 1931

14 Claims. (Cl. 179—100.3)

The present invention relates to the recording of sound upon a light sensitive surface.

For simplicity, the light sensitive surface, whether it be in the form of a long strip, an endless loop, a disc or a drum, and whether it be transparent or opaque, will be termed a "film" and the actual record of the sounds upon the developed film, which may be in the form of an opaque line of varying width, will be termed the "sound trace".

In apparatus for the recording of sound which is at present in common use, a beam of light is projected through a slit-like aperture, and, after reflection in a mirror which is oscillated in accordance with the sounds to be recorded, is focussed by means of a suitable lens or lens combination upon a moving film. The image of the slit so formed lies with its longer axis in a direction perpendicular to the direction of motion of the film, and the mirror is oscillated about an axis which is parallel to the direction of motion of the film. In some cases, a part of this image is screened off by a diaphragm placed close to the film, and thus it is an image of only one end of the slit which is varied in position on the film. This end of the slit may be called the "recording" end or edge.

In order that sounds of comparatively high frequency may be recorded faithfully upon the film, it is necessary that the slit image upon the film should be of extremely narrow width, and difficulty has been experienced in obtaining an image which, while sufficiently narrow, is also of a sufficiently high intensity to render the sound trace, when developed, substantially opaque. Proposals for decreasing the width without diminishing the intensity of the image include the use of a cylindrical lens so placed in the optical system that the image is rendered extremely narrow while its length remains unaltered.

It is an object of the present invention to provide improved apparatus of this character wherein the light available for projection upon the film is still more efficiently focussed thereon.

According to the present invention, in a system for recording sound upon a moving light sensitive film comprising an illuminated aperture, a recording edge and a mirror oscillating in accordance with the sounds to be recorded, there is provided an optical system adapted to focus upon said film, a primary image of said recording edge and a secondary image of said illuminated aperture.

If desired, the first, or primary, image of the illuminated aperture may be formed by a spherical optical system and the secondary image by a cylindrical system. The advantage of utilizing a secondary image of the aperture is that a greater amount of light may be collected from the aperture and focussed upon the moving film.

The invention will now be described with reference to the accompanying drawing, in which Figure 1 illustrates, diagrammatically and in perspective, the optical parts of a sound-recording system arranged in accordance with the present invention, and Figs. 2 and 3 illustrate, diagrammatically, in plan and elevation, respectively, the path of the rays of light through the system of Fig. 1.

For the sake of clarity, the optical elements in Figs. 2 and 3 are arranged in a straight line while in Fig. 1 they are arranged in positions approximating those used in practice.

Referring now to Fig. 1, a beam of light from a source 1 is focussed upon an oscillograph mirror 2 by means of a spherical condensing lens 3. The mirror 2 is adapted to be oscillated, in accordance with the sounds to be recorded, about an axis 13 which is perpendicular to the source 1 and which lies in the plane of the mirror 2. The means for effecting such oscillation are, however, quite well known in the art and therefore have not been illustrated. Close to the condensing lens 3 is placed a slit-like aperture 4, and, by means of a spherical lens 5, an image of the illuminated aperture 4 is focussed at a point 6 lying between the mirror 2 and a moving light-sensitive film 7. Between the primary image 6 and the film 7 there is placed a cylindrical lens 8 with one of its axes, namely, that one which passes through the center of the lens, in a direction parallel to the axis of the cylinder or cylinders of which the curved surfaces of the lens are part, lying parallel to the length of the primary image 6. By means of the cylindrical lens 8, an image 9 of the primary image 6 is formed upon the film 7. This image 9 may be called the secondary image of the aperture 4.

It should be noted that, since the primary image 6 is formed by means of the spherical lens 5, both the long and short boundaries of this image are in focus, but since the secondary image is formed by means of the cylindrical lens 8, of which the axis is parallel to the long boundaries of the primary image, then, of the secondary image, only the long boundaries are in focus. It is therefore necessary to provide some means for masking off both the end boundaries of the secondary image 9. One of these boundaries is masked off by means of a sharp edged diaphragm 10 placed as close to the film 7 as is conveniently possible, and the other is obscured by means of another sharp edged diaphragm 11, which will be called the recording edge, placed in the recording light beam at a point between the aperture 4 and the oscillograph mirror 2, so as to obscure about a quarter of the light which is transmitted by the slit. An image of the recording edge 11 is focussed, by the lens 5, directly upon the moving film.

Referring now to Figs. 2 and 3, it will be seen that the lens 5 is shown on either side of the mirror 2. This is explained by the fact that light from the source 1 passes through the lens 5, is reflected at the mirror 2 and then passes again through the same lens 5. From an inspection of Fig. 2, it will be seen that a primary image of the aperture 4 is formed at 6 (the rays forming this image being indicated by the full lines), and that rays from this image extend over the whole width of the cylindrical lens 8. In other words, the full aperture of the cylindrical lens 8 is utilized in the formation of the image 9 upon the film 7.

From an inspection of Fig. 3, it will be seen that the end boundary 12 of the secondary image of the aperture 4 formed upon the film 7 is out of focus. This end boundary is therefore masked off by the diaphragm 10. The other end boundary is screened off by the recording edge 11, a primary image of the edge 11 being formed upon the film 7 (as shown by the dotted lines) by the lens 5.

There is thus formed upon the film an image 9 which is extremely narrow since use has been made of a cylindrical lens, and which is extremely intense since use has been made of the full aperture of the cylindrical lens. One end of this image is obscured by the diaphragm 10 at the film and the other by the image of the recording edge 11. Under the influence of the oscillating mirror 2, the image of the recording edge 11 is moved up and down to obscure more or less of the length of the narrow image upon the film, and since the film is moving in a direction perpendicular to these oscillations, a sound trace is formed upon the film one edge of which is a straight line and the other of which is a representation of the wave form of the sound.

To those skilled in the art, there will at once be apparent various modifications, other than that described above, lying within the scope of this invention as defined in the appended claims. For example, the oscillograph mirror, which has been described as plane, may be curved, in which case the lens 5 may be omitted. In practice, the simple lenses 3, 5 and 8 may conveniently be replaced by achromatic combinations of lenses. My invention, therefore, is not to be restricted except insofar as is necessitated by the prior art and by the spirit of the appended claims.

I claim as my invention:

1. In a system for recording sound upon a moving light sensitive film, the combination of means providing an aperture, means for illuminating said aperture, a light masking device for limiting the light passed through said aperture, a light reflecting member adapted to be oscillated in accordance with sounds being recorded and to reflect said limited light, and optical means for focussing upon said film a primary image of said light masking device and a secondary image of said illuminated aperture.

2. In a system for recording sound upon a moving light sensitive film, the combination of means providing an aperture, a light source on one side of said means for illuminating said aperture, a light reflecting member on the other side of said means adapted to be oscillated in accordance with sounds being recorded and to reflect the light passed through said aperture, a light masking device interposed between said aperture providing means and said light reflecting means, and optical means for focussing upon said film a primary image of said light masking device and a secondary image of said illuminated aperture.

3. A system according to claim 1 wherein said optical means comprises a spherical lens adapted to form said primary image of the light masking device, and a cylindrical lens adapted to form said secondary image of the illuminated aperture.

4. A system according to claim 1 wherein said optical means comprises a spherical lens adapted to form said primary image of the light masking device, and a cylindrical lens adapted to form said secondary image of the illuminated aperture and wherein substantially the full apertures of said spherical and cylindrical lenses are utilized in the formation of said images.

5. In a system for recording sound upon a moving light sensitive film, the combination of a movable film, means providing an aperture, means for illuminating said aperture, a light masking device for limiting the light passed through said aperture, a light reflecting member adapted to be oscillated in accordance with sounds being recorded and to reflect said limited light toward said film, optical means for focusing upon a plane between said light reflecting member and said film a primary image of said aperture as limited by said masking device, and an optical device for projecting an image of said primary image upon said film.

6. In a system for recording sound upon a moving light sensitive film, the combination of a movable film, means providing an aperture, means for illuminating said aperture, a light masking device for limiting the light passed through said aperture, a light reflecting member adapted to be oscillated in accordance with sounds being recorded and to reflect said limited light toward said film, a spherical lens for focusing upon a plane between said light reflecting member and said film a primary image of said aperture as limited by said masking device, and a cylindrical lens for projecting an image of said primary image upon said film.

7. In a system for recording sound upon a moving light sensitive film, the combination of a movable film, means providing an aperture, means for illuminating said aperture, a light masking device for limiting the light passed through said aperture, a light reflecting member adapted to be oscillated in accordance with sounds being recorded and to reflect said limited light toward said film, a spherical lens for focusing upon a plane between said light reflecting member and said film a primary image of said aperture as limited by said masking device, and a cylindrical lens effective only in a plane at right angles to the plane of the film for projecting an image of said primary image upon said film.

8. In a system for recording sound upon a moving light sensitive film, the combination of a movable film, means providing an aperture, means for illuminating said aperture, a light masking device for limiting the light passed through said aperture, a light reflecting member adapted to be oscillated in accordance with sounds being recorded and to reflect said limited light toward said film, a spherical lens for focusing upon a plane between said light reflecting member and said film a primary image of said aperture as limited by said masking device, a cylindrical lens for projecting a secondary image of said primary image upon said film, said cylindrical lens being so disposed as to be effective to reduce said primary image only in the direction of travel of said film, and a second light masking device for masking off from said film a portion of said secondary image in a direction at right angles to the direction of travel of said film.

9. In the method of recording sound photographically upon a moving film by means including an illuminated aperture, a light masking device, a spherical lens, and a cylindrical lens, the steps which comprise focusing upon said film a primary image of said light masking device by means of said spherical lens and focusing upon said film a secondary image of said illuminated aperture by means of said cylindrical lens.

10. In the method of recording sound photographically upon a moving film by means including an illuminated aperture, a light masking device, a spherical lens, and a cylindrical lens, the steps which comprise focusing upon said film a primary image of said light masking device by means of said spherical lens and simultaneously focusing upon said film a secondary image of said illuminated aperture by means of said cylindrical lens.

11. A method according to claim 9 characterized by the fact that substantially the full apertures of said spherical and cylindrical lenses are utilized in the formation of said images.

12. In the method of recording sound photographically upon a moving film by means including an illuminated aperture, a light masking device and a vibratory reflecting member, the steps which comprise forming, in a plane between said reflecting member and said film, an image of said aperture as limited by said light masking device, and focusing upon said film an image of said first named image reduced in one direction only.

13. In the method of recording sound photographically upon a moving film by means including an illuminated aperture, a light masking device and a vibratory reflecting member, the steps which comprise forming, in a plane between said reflecting member and said film, an image of said aperture as limited by said light masking device, and focusing upon said film an image of said first named image reduced only in the direction of travel of said film.

14. In the method of recording sound photographically upon a moving film by means including an illuminated aperture, a light masking device and a vibratory reflecting member, the steps which comprise forming, in a plane between said reflecting member and said film, an image of said aperture as limited by said light masking device, focusing upon said film a secondary image of said first named image reduced in the direction of travel of said film, and masking off from said film a portion of said secondary image in a direction at right angles to the direction of travel of said film.

CECIL OSWALD BROWNE.